3,444,074
HYDRODENITROGENATION PROCESS WITH A CATALYST CONTAINING SILICA-ZIRCONIA GEL, A METAL FLUORIDE AND A HYDROGENATION COMPONENT
Tsoung-Yuan Yan, Gloucester, N.J., assignor to Mobil Oil Corporation, a corporation of New York
No Drawing. Filed May 2, 1966, Ser. No. 546,568
Int. Cl. C10g *23/02;* B01j *11/78, 11/32*
U.S. Cl. 208—254                                                7 Claims

ABSTRACT OF THE DISCLOSURE

A catalyst is formed with (1) a silica-zirconia gel containing 75–90% by wt. silica and 10–25% by wt. zirconia intimately admixed with (2) 0.1–25% by wt. of said gel of a hydrogenation component, (3) the composite containing 0.1–10% by wt. of a metal fluoride, in which the metal may be bismuth, aluminum, gallium, indium, thallium or a rare earth and (4) the composite catalyst having a sulfur content of 1–15% by wt. The catalyst is utilized in a hydrodenitrogenation reaction at a temperature of 400–950° F.

---

This invention relates to the preparation of catalysts for use in petroleum refinery processes characterized in part by hydrogenation of unsaturated bonds in the charged molecules or generated by reactions in the process. Such refinery processes include hydrofinishing, hydrotreating, hydrodenitrogenation, and the like. The invention particularly relates to the hydrocatalytic denitrogenation of petroleum hydrocarbons. Thus, this invention is concerned with the preparation of a catalyst suitable for hydrodenitrogenation and other hydroprocessing. The method of preparing the catalyst comprises intimately admixing a silica-zirconia gel with a metal, metal oxide or metal sulfide wherein the metal is from Group VI–B, Group VIII, or both, of the Periodic Table, to thereby form a composite, and thereafter incorporating into the composite from about 0.1 to 10 percent by weight of a metal fluoride wherein the metal is a Group III–A metal, a rare earth, bismuth, or mixtures thereof. The invention further relates to the resulting catalyst and to its use in the hydrodenitrogenation of petroleum hydrocarbons.

As is well known, cracking refers generally to operations wherein a long-chain hydrocarbon or a mixture of high molecular weight hydrocarbons is converted into a shorter chain hydrocarbon or into a mixture of lower molecular weight hydrocarbons. Cracking, accomplished solely as a result of the high operational temperature employed is known as thermal cracking while cracking effected in the presence of catalysts is ordinarily known as catalytic cracking. Cracking carried out in the presence of hydrogen is referred to as hydrocracking.

Catalytic cracking of petroleum hydrocarbons has heretofore been carried out at temperatures in the range of 800 to 1100° F. Such high temperatures have been inefficient from an economic standpoint and undesirable from an operational standpoint resulting from the production of unwanted coke, relatively large amounts of dry gas and excess quantities of $C_4$ hydrocarbons. The production of coke and dry gas represents a loss thereby bringing about an overall decrease in the yield of useful cracked product.

As is well known, charge stocks heretofore employed in catalytic cracking operations have been selected petroleum stocks. Thus, heavy residual stocks as well as cycle stocks obtained from the catalytic cracking of non-refractory petroleum cracking stocks have not been suitable for catalytic cracking processes because of their inherent coke forming characteristics and the excessive amounts of dry gas produced. Accordingly, the supply of available cracking stocks has been somewhat restricted.

Cracking operations carried out in the presence of hydrogen at relatively high temperatures and under high pressures, i.e. hydrocracking, offer greater range as to the type of utilizable charge stock. Thus, cycle stocks, heavy residuals, etc. can be cracked in hydrocracking operations. Conventional operations of this type, however, have many disadvantages. Thus, in order to maintain catalyst activity at a desired level and to avoid heavy disposition of coke on the catalyst, it has been found necessary to employ excessively high hydrogen pressures of the order of about 3000 pounds per square inch and generally higher. Such pressures have necessitated the use of expensive high pressure equipment.

Additionally, inasmuch as the charge stock which is to be hydrocracked generally contains organic nitrogen, typically bonded to carbon atoms in a heterocyclic ring, e.g., carbazole, pyrrole, pyridene, or the like, the hydrocracking conditions as to temperature must be relatively high, say of the order of about 750 to 800° F. That is, the presence of organic nitrogen compounds and particularly of unsaturated heterocyclic nitrogen compounds in the charge stock requires that relatively high temperatures be employed for hydrocracking. Such conditions also result in undesirably large yields of dry gas, coke, and $C_4$ hydrocarbons.

In accordance with the present invention there is provided a hydrodenitrogenation catalyst suitable for use with a nitrogen-containing hydrocarbon charge, whereby the nitrogen content is significantly reduced. Accordingly, after removal of nitrogen from the charge, it may be subjected to hydrocracking under relatively mild conditions of temperature and pressure, whereby the amount of undesired by-products (e.g., dry gas, coke, $C_4$'s) is lessened. Thus, the yield is characterized by improved product distribution.

The hydrodenitrogenation catalyst of this invention comprises a silica-zirconia gel admixed with a hydrogenation component, namely, a metal, metal oxide, or metal sulfide wherein the metal is from Groups VI–B, VIII, or both, of the Periodic Table, to form a composite, this composite having incorporated therein from about 0.1 to 10 percent by weight of a metal fluoride wherein the metal is bismuth, a rare earth metal, or a Group III–A metal.

The present invention also provides a process for denitrogenation of hydrocarbons and particularly petroleum hydrocarbon fractions having an initial boiling point of at least about 400° F., a 50 percent point of at least about 500° F. and an end boiling point of at least about 600° F. and boiling substantially continuously between said initial boiling point and said end boiling point by contacting said fractions with the above catalyst in the presence of hydrogen at a pressure between about 500 and about 5000 pounds per square inch gauge, at a liquid hourly space velocity of between about 0.1 and about 10, at a temperature between about 400° F. and 950° F., employing a molar ratio of hydrogen to hydrocarbon charge between about 2 and about 80.

The invention further is concerned with a method of preparing the foregoing hydrodenitrogenation catalyst comprising admixing a silica-zirconia gel with a metal, metal oxide or metal sulfide wherein the metal is from Groups VI–B, VIII, or both, of the Periodic Table to form a composite, and incorporating in the composite from about 0.1 to 10 percent by weight of a metal fluoride wherein the metal is bismuth, a rare earth metal, or a Group III–A metal.

The exact mechanism whereby the catalysts of this invention effect organic nitrogen removal from the charge stock is not known. Considering nitrogen-containing unsaturated heterocyclic ring compounds, e.g., pyridine, the carbon-nitrogen bond is a strong one. It is believed that by using the catalyst of the present invention, the pyridine is first hydrogenated to form a saturated heterocyclic (piperidine), the carbon-nitrogen bonds (which are weaker than in pyridine) are broken, and ammonia is formed and immediately volitalizes.

It appears the presence of the metal fluoride, e.g., aluminum fluoride, in the composite enhances its denitrogenation activity in that the composite catalyst exhibits a relatively stronger and more selective adsorption of nitrogen compounds and an ability to weaken the carbon-nitrogen bonds.

The silica-zirconia hydrogel is conveniently prepared by intimately mixing an aqueous acid zirconium salt solution with an aqueous alkali metal silicate solution in such proportions as to form a hydrosol having a pH of from about 7 to 10 and capable of setting to a hydrogel containing from about 75 to 90 percent by weight silica and correspondingly from about 25 to 10 percent zirconia, these proportions being based on cogelled oxides. The resulting hydrosol is permitted to set to a hydrogel.

If desired, the hydrogel may be subjected to hydrothermal treatment so as to control the density of the finished catalyst.

The hydrogel may then be activated by treatment at an elevated temperature with a low pH solution of an acid, and subsequently scavenged (e.g., treated with an ammonium salt solution) to remove any residual zeolitic alkali therefrom. The hydrogel is then washed free of soluble matter and dried.

As noted, the pH during the formation of the hydrogel is desirably from about 7 to 10. A more preferred pH range is from about 8 to 9.

If desired, the silica-zirconia hydrogel may, prior to hot activation, be subjected to hydrothermal treatment, i.e., contacted with water at an elevated temperature for a specified period of time. Such treatment affords a convenient means for controlling the density of the finished catalyst. In general, the higher the temperature and the longer the time of treatment, the lower is the density of the finished catalyst. If the hydrogel is subjected to a hydrothermal treatment, such treatment is desirably carried out at a temperature of from about 70 to 200° F., or more preferably from about 70 to 150° F., for a period of from about 6 to 24 hours.

If a hot activation step is employed, the treating medium generally comprises an aqueous solution of any of the usual mineral acids, e.g., HCl, $H_2SO_4$, $HNO_3$, etc. The pH of the activation solution is desirably from about zero to 4. Activation is carried out using a hot solution, preferably at a temperature of from about 125 to 200° F., and most preferably from about 150 to 200° F. The acid concentration is generally from about 1 to 5 percent by weight, with the remainder being water. The time required for the activation of the hydrogel may vary within wide limits, e.g. from as little as one hour up to about 24 hours. More preferably the time is from about 5 to 12 hours.

The alkali metal silicate reactant employed in the preparation of the present catalyst is generally sodium silicate, but it is contemplated that other alkali metal silicates such as potassium silicate may likewise be used.

The aqueous acidic zirconium salt solution, preferably sulfatozirconic acid solution, is conveniently prepared by adding appropriate quantities of sulfuric acid and zirconium sulfate to water. Of course, other soluble zirconium salts may be substituted for zirconium sulfate, such as zirconium halides, zirconium nitrates, zirconium carbyxylates (e.g. acetate), and the like. Other acids, particularly other mineral acids, may be substituted for sulfuric acid. If necessary, suitable complexing agents may be employed to prevent gelation of the basic solution prior to its admixture with the sulfatozirconic acid solution. Typical complexing agents include citric acids, glycolic acids, and the like.

After activation the hydrogel may be scavenged with a suitable aqueous solution to remove any zeolitic alkali introduced into the hydrogel from the silicate solution and not removed by hot activation. The hydrogel may be base exchanged with a suitable aqueous solution containing an ion capable of replacing zeolitic alkali metal, which ion does not detrimentally affect the finished catalyst. Thus, the base exchange solution employed may effect replacement of the zeolitic alkali metal without involving the hydrogel, such as treatment with a solution of an ammonium salt or acid. By using a base exchange solution or a metal salt other than a metal already contained in the hydrogel, it is possible to introduce quantities of an additional metal oxide into the gel composite. The incorporation of such additional metal oxide into the hydrogel may desirably act as a catalytic promotor under particular reaction conditions.

An aqueous solution of an ammonium salt, e.g., ammonium sulfate, has been found to be very satisfactory for scavenge. The scavenge may be carried out at room temperature or at temperatures up to about 200° F. Where an aqueous solution of an ammonium salt, e.g., ammonium sulfate, is used such solution should desirably contain from about 0.05 to 1 weight percent of ammonium sulfate. The treatment with the base exchange solution may vary from about one-half hour up to 36 hours. More preferably, the treatment may be from about one-half hour up to 24 hours.

While as described herein the hot activation step and the scavenge step are carried out successively, if desired, these two steps can be combined into a single operation, this latter offering obvious economical advantages in commercial production.

The hydrogel product after scavenge is water washed free of soluble matter. The washed hydrogel is then dried, suitably in an atmosphere of superheated steam, at a temperature of from about 150 to 400° F. The product is thereafter calcined for from about 1 to 24 hours, suitably in an atmosphere of air or steam, at a temperature of from about 1100 to 1600° F. A more preferred range for calcining is from about 1200 to 1450° F.

The above silica-zirconia gel is intimately combined with a component exhibiting hydrogenation activity. Suitable hydrogenation components include one or more of the metals of Group VI and VII of the Periodic Table, either in elemental form, or in the form of the oxides or sulfides of these metals. Representative of these metals are molybdenum, chromium, tungsten, iron, cobalt, nickel, and metals of the platinum group, as well as combinations of these metals, their oxides, or sulfides. Thus, a particularly desirable combination of metal oxides is that of the oxides of cobalt and molybdenum intimately combined with the above described silica-zirconia gel such as by being impregnated thereon.

Combinations of one or more of the above indicated hydrogenation components with the silica-zirconia gel may take place in any feasible manner, for example, by impregnating the silica-zirconia gel by contacting the same with solutions containing ions of the appropriate hydrogenation component which it is desired to introduce. In this manner, a hydrogenation component can be introduced by deposition of the incoming metal on the silica-zirconia gel. The hydrogenation component may also be combined with the silica-zirconia gel by utilizing a mixed base technique wherein the base containing the hydrogenation component, for example, cobalt oxide-molybdenum oxide on alumina is admixed in finely divided form with the silica-zirconia gel. In such mechanical mixtures, the particle size of each of the components making up such a mixture is generally less than about 100 microns in diameter. Other means for combining the silica-zirconia gel with the hydrogenation component are feasible, such as, for example, the addition of the hydrogenation component to a slurry of the gel.

The amount of hydrogenation component combined with the silica-zirconia gel may vary widely and will depend on the charge stock as well as on the particular nature of the hydrogenation component. Generally, the amount of hydrogenation component will be within the range of about 0.01 to 25 percent by weight. When a metal of the platinum series is employed, the amount thereof will generally range from about 0.01 to 5 weight percent. With other hydrogenation components such as the oxides or sulfides of molybdenum, cobalts, tungsten, chromium, iron, and nickel, the amounts employed will generally be within the approximate range of 2 to 25 weight percent. Thus, when the hydrogenation component is a combination of cobalt oxide and molybdenum oxide, the cobalt oxide content is generally in the approximate range of 1 to 5 weight percent and the molybdenum oxide is within the range of 5 to 15 weight percent. Thus, a composite containing about 3 weight percent CoO and 10 weight percent $MoO_3$ is particularly suitable. Another hydrogenation component of particular interest is a nickel-tungsten combination, e.g., nickel oxide and tungsten oxide.

The foregoing composite is then treated with metal fluoride so as to incorporate such metal fluoride therein. As noted, the metal may be bismuth, a rare earth metal, a Group III–A metal (i.e., aluminum, gallium, indium, and thallium), or mixtures thereof, with particular preference being accorded aluminum fluoride.

When the hydrogenation component (previously introduced to the silica-zircondia gel to form the catalyst composite) is a metal or metal oxide, the resulting catalyst is desirably sulfided, e.g., by treatment with hydrogen sulfide and hydrogen, or by utilizing a solution of mercaptan or carbon disulfide in a hydrocarbon solvent. Alternatively the sulfiding may be effected by treating the catalyst with a charge stock having a high sulfur content such as, e.g., Kuwait gas oil.

The sulfide content of the finished catalyst is generally from about 1 to 15 percent by weight, expressed as free sulfur. A more preferred range is from about 3 to 9 weight percent.

The sulfiding has been found to improve the performance of the catalyst. Thus, at a given temperature, a sulfided catalyst will give a higher percent conversion than the same catalyst in the absence of sulfiding. Additionally, sulfiding increases the isomerization activity of the catalyst. The sulfided catalyst also exhibits improved stability.

Where the hydrogenation component is present as metal sulfide (rather than metal or metal oxide), the sulfiding step may be eliminated. Even with a metal sulfide hydrogenation component, however, it is preferred that the resulting composite be subjected to sulfiding prior to using it as a catalyst.

The sulfiding may conveniently be carried out when the catalyst is charged to the hydrotreating unit, as illustrated in the subsequent examples.

If the metal fluoride is $AlF_3$, then the charge stock should be free of dissolved water. Thus, any such water will form steam under the reaction conditions, tending to decompose $AlF_3$ to alumina and HF.

The charge stock invariably contains organic oxygen. Under the reaction conditions, this is hydrogenated to water. Therefore, in accordance with another aspect of this invention, a two stage process may be employed. The first stage utilizes the "unpromoted" composite, that is, the silica-zirconia-hydrogenation component composite. Since oxygen is more easily removed than nitrogen, the charge stock is contacted with unpromoted composite in the first stage so as to remove all of the oxygen and a portion of the nitrogen. The effluent is dried and then charged to the second stage, wherein the "promoted" composite (silica-zirconia-hydrogen component impregnated with metal fluoride) is employed to effect removal of additional nitrogen.

Charge stocks undergoing hydrodenitrogenation in accordance with this invention comprise hydrocarbons generally, and, particularly, petroleum fractions having an initial boiling point of at least about 400° F., a 50 percent point of at least about 500° F. and an end point of at least about 600° F. Such hydrocarbon fractions include gas oils, residual oils, cycle stocks, whole topped crudes and heavy hydrocarbon fractions derived by the destructive hydrogenation of coal, tars, pitches, asphalts and the like. As will be recognized, the distillation of higher boiling petroleum fractions above about 650° F., must be carried out under vacuum in order to avoid thermal cracking. The boiling temperatures utilized herein are expressed in terms for convenience of the boiling point corrected to atmospheric pressure.

Hydrodenitrogenation in accordance with the present process is generally carried out at a temperature between about 400° F. and about 950° F. The hydrogen pressure in such operation is generally within the range of about 100 to about 5000 p.s.i.g. and, preferably, about 500 to about 2500 p.s.i.g. The liquid hourly space velocity, i.e. the liquid volume of hydrocarbon per hour per volume of catalyst is between about 0.1 and 10, and preferably between about 0.1 and 4. In general, the molar ratio of hydrogen to hydrocarbon charge employed is between about 2 and about 80, and preferably, between about 5 and about 40.

The process of this invention may be carried out in any equipment suitable for catalytic operations. The process may be operated batchwise. It is preferable, however, and generally more feasible to operate continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation may also be employed with the catalyst described herein.

After hydrodenitrogenation of the charge stock has been effected, hydrocracking may be carried out. As noted, inasmuch as the organic nitrogen content of the charge stock has been reduced by virtue of the hydrodenitrogenation, relatively mild conditions may be employed in the hydrocracking operation, thereby ensuring improved product distribution (reduced yields of coke, dry gas, and $C_4$'s). Typical conditions for hydrocracking are: a temperature of from about 500 to 800° F.; a pressure of from about 1000 to 2000 p.s.i.; a liquid hourly space velocity of 0.5 to 2; and a hydrogen circulation rate of from about 5000 to 7000 s.c.f./b.

After hydrocracking, the resulting products may readily be separated from the remaining components by conventional means such as adsorption, distillation, etc. Also, the catalyst after use over an extended period of time may be regenerated in accordance with conventional procedures by burning off carbonaceous deposit from the surface of the catalyst in an oxygen-containing atmosphere under conditions of elevated temperature.

The process described herein may be employed in the preparation of a silica-zirconia catalyst in any desired physical form. Thus, the hydrosol may be permitted to set in mass to a hydrogel which is thereafter dried and broken into pieces of desired size. The pieces of gel so obtained are generally of irregular shape. Uniformly shaped pieces of gel may be obtained by extrusion of pelleting of the powder-containing hydrogel. Also the hydrosol may be introduced in the the perforations of a perforated plate and retaind therein until the sol has set to a hydrogel after which the formed hydrogel pieces are removed from the plate. The method of the invention is especially useful as applied to the manufacture of spherically shaped gel particles produced by any feasible process such as that described in patents to Marisic, for example, U.S. 2,384,946. Broadly, such methods involve introducing hydrosol into a column of water-immiscible liquid, for example, an oil medium wherein globules of hydrosol are formed and set to spheroidal bead-like particles of hydrogel. Larger size spheres are ordinarily within the range of from about ⅟₆₄ to about ½ inch in diameter whereas smaller size spheres which are generally referred to as microspheres are within the range of from about 10 to about 100 microns in diameter. The use of spherically shaped gel particles is of particular advantage in hydrocarbon conversion processes including the moving catalyst bed process, the fluidized process and other processes in which the spheroidal silica-zirconia catalyst particles are subjected to continuous movement.

The following examples will further illustrate this invention. All parts are by weight unless otherwise stated. In each of these examples the charge stock used consisted of the following blends of streams:

|  | Percent |
|---|---|
| Coker heavy naphtha | 18 |
| Virgin heavy gas oil | 51 |
| TCC light gas oil | 11 |
| TCC heavy gas oil bubble tower bottoms | 20 |
|  | 100 |

Analysis of the blend is as follows:

| Nitrogen, p.p.m. | 3300 |
|---|---|
| Sulfur, wt. percent | 1.27 |
| Aniline No., °F. | 123 |
| Gravity, °API | 18.7 |

Distillation, ASTM, °F.:

| IBP | 361 |
|---|---|
| 5% | 422 |
| 10 | 440 |
| 30 | 596 |
| 50 | 762 |
| 70 | 845 |
| 90 | 903 |
| E.P. | 933 |
| Percent Rec. | 95.0 |

EXAMPLE 1

A silica-zirconia support was produced from the following reactants:

Solution A which consisted of 298.2 parts by weight "N" brand sodium silicate (28.7% $SiO_2$, 8.9% $Na_2O$, 62.4% $H_2O$) and 198.8 parts by weight of water. Specific gravity=1.212.

Solution B which was prepared by adding 32.0 parts $Zr(SO_4)_2 \cdot 4H_2O$, 15.8 parts $H_2SO_4$ (100%), and 381.5 parts $H_2O$. Specific gravity=1.079.

410 cc./min. of solution A and 397 cc/min of solution B were quickly mixed with agitation to form a hydrosol having a pH of 8.5. Gelation to a firm hydrogel occurred in 3 seconds at 53° F.

The resulting hydrogel, after standing about 2 hours at room temperature, was contacted with a 3 percent by weight aqueous solution of $H_2SO_4$ which caused the pH of the hydrogel to drop to about 1.7. The hydrogel was then aged and activated by maintaining the same in the above solution for 7½ hours at 200° F. during which time the pH rose to about 2.0.

The treated hydrogel was then base-exchanged to remove zeolitic impurities by contacting with a 0.1 weight percent aqueous solution of ammonium sulfate involving 12 1-hour treatments employing approximately one volume of ammonium sulfate solution per volume of gel for each treatment.

The base-exchanged hydrogel was then washed with water until substantially free of sulfate ion, dried in steam at 250° F.–300° F., crushed to about 8–16 mesh, and calcined 3 hours at 1000° F. (5 vol. of air per min. per vol. of gel.) The resulting gel contained 10.4 wt. percent $ZrO_2$.

The foregoing silica-zirconia was then vacuum impregnated to 10% $MoO_3$ content. (2863 g. of hydrogel were treated with 384 g. [85.5% $MoO_3$] molybdic acid in 1200 cc. ammoniacal solution.) The product was dried at 250° F. and calcined 3 hours at 1000° F. This was followed by vacuum impregnated to a 3% CoO level with an aqueous $CoCl_2$ solution (saturated with $CoCl_2$). 368 g. of cobaltous nitrate (79.2% CoO) in 1040 cc. $H_2O$ were employed. The product was then dried at 250° F., and calcined for 3 hours at 1000° F. The catalyst analyzed: 2.9% CoO and 8.5% $MoO_3$; 259 m.²/g. surface area; 1.60 g./cc. particle density; 2.50 g./cc. real density; 0.224 cc./g. pore volume. The catalyst was charged to the hydrotreating unit, and sulfided in place with 2 mole percent $H_2S$ in $H_2$, the flow rate being 1 liter/hr./cc. catalyst, at 500 p.s.i.g., 500–750° F., for 11 hours, to a sulfide content of 5.6 wt. percent (expressed as free sulfur). The table shows that this catalyst at 750° F., 0.5 LHSV reduced nitrogen to 300 p.p.m. (91% removal) with 1060 s.c.f./bbl. hydrogen consumption and 12.4% conversion (10 minus product boiling about 390° F.).

EXAMPLE 2

Example 1 was repeated, however the conditons in the unit were 801° F. and 1 LHSV rather than the conditions of Example 1 (750° F., 0.5 LHSV). Under these conditions and as shown in the table, the nitrogen content was reduced to 89 p.p.m. (97% removal), with 990 s.c.f./bbl. hydrogen consumption and 17.7% conversion.

EXAMPLE 3

Example 1 was repeated. However, after calcining and before sulfiding in the unit, the catalyst was impregnated to 0.5 wt. percent $AlF_3$ ($AlF_3$ saturated in $H_2O$), and then dried at 230° F.

As shown in the table, this catalyst reduced nitrogen to 14 p.p.m. (94% removal) compared to 300 p.p.m. in Example 1, with 905 s.c.f. $H_2$ consumption (compared to 1060 in Example 1) and 8.4% conversion (compared to 12.4 in Example 1).

EXAMPLE 4

Example 3 was repeated, however the conditions in the unit were 802° F. and 1 LHSV. Under these conditions nitrogen content was reduced to 66 p.p.m. (98% removal) compared to 89 in Example 2, with 990 s.c.f. $H_2$ consumption (compared to 990 in Example 2), and 12.9% conversion (compared to 17.7% in Example 2).

TABLE.—HYDROTREATING RESULTS

Pressure: 2,000 p.s.i.g.
$H_2$ circulation: 7,500 s.c.f./bbl.

|  | Example No. | | | |
|---|---|---|---|---|
|  | 1 | 2 | 3 | 4 |
|  | Sulfided | | | |
| Catalyst | Co/Mo/Si/Zr | | $AlF_3$-Co/Mo/Si/Zr | |
| LHSV | 0.5 | 1 | 0.5 | 1 |
| Temp., °F | 750 | 801 | 750 | 802 |
| Product collection, hrs.: | | | | |
| Total liq. product, °API | 30.5 | 30.6 | 28.5 | 30.6 |
| Nitrogen content, p.p.m.[1] | 300 | 89 | 194 | 66 |
| Material balance conv., 100 minus 390° F.+ | 12.4 | 17.7 | 8.4 | 12.9 |
| $H_2$ consumption, s.c.f./bbl | 1,060 | 990 | 905 | 990 |
| Yields: | | | | |
| $C_1$-$C_3$, wt. percent | 1.3 | 1.8 | 1.2 | 1.6 |
| $C_4$'s, vol. percent | 1.6 | 0.9 | 0.1 | 1.1 |
| $C_5$'s, vol. percent | 1.8 | 1.7 | 0.2 | 1.9 |
| 125–180° F., vol. percent | 1.5 | 2.2 | 1.9 | 1.9 |
| 180–390° F., vol. percent | 14.6 | 19.2 | 11.0 | 14.2 |
| 390° F.+, vol. percent | 87.6 | 82.3 | 91.6 | 87.1 |
| Total $C_4$+, vol. percent | 107.1 | 106.3 | 104.8 | 106.2 |
| 180–390° F. naphth., °API | 46.8 | 45.5 | 46.4 | 47.4 |
| 390° F.+ product, °API | 26.6 | 25.5 | 25.2 | 26.0 |

[1] Total liquid product water-washed to remove dissolved $NH_3$ before analysis.

The use of a silica-zirconia gel as the catalyst matrix is particularly advantageous for denitrogenation. For instance, as compared to the use of a catalyst wherein the matrix is alumina, the silica-zirconia based catalyst exhibits considerably superior capacity to remove nitrogen in heavy nitrogen-containing stocks, e.g., condensed ring compounds. It appears that the greater acidity of the silica-zirconia based catalyst enhances its ability to open up carbocyclic rings in such heavy nitrogen-containing compounds to thereby gain access to the nitrogen atom on the heterocyclic ring. Additionally, the silica-zirconia based catalyst exhibits unusually good stability and is highly selective, e.g., as compared to a silica-alumina based catalyst, in effecting nitrogen removal without undesired reactions such as cracking.

As noted previously, while the catalyst of this invention is particularly suitable for hydrodenitrogenation, it may also be employed with advantage in various other petroleum refinery processes characterized in part by hydrogenation, i.e., introducing hydrogen to satisfy unsaturated bonds that are either present in the charged molecules or are generated by reactions in the process. Typical other petroleum refinery processes wherein the catalyst of the present invention can be advantageously employed include hydrofinishing, hydrotreating, and the like.

Hydrofinishing is generally employed for the reduction of olefins and the reduction of any polar trace compounds. The hydrofinishing is desirably carried out at a temperature of from about 400 to 700° F. at a hydrogen pressure of from about 250 to 1000 p.s.i.g. The liquid hourly space velocity should be from about 2.0 to 6.0. The amount of hydrogen consumed is ordinarily from about 25 to 50 s.c.f./b.

Hydrotreating is usually employed in order to reduce the content of metal, sulfur, nitrogen, and/or oxygen, in the charge and also to effect hydrogenation of aromatics present so as to upgrade the charge stock for subsequent catalytic reactions, e.g., reforming, cracking, hydrocracking, etc. The upgrading removes or reduces in quantity those components which tend to exert an adverse effect on the catalyst used in the subsequent reactions. Hydrotreating is desirably carried out at a temperature of about 600 to 850° F. with a hydrogen pressure of from about 250 to 3000 p.s.i.g. The liquid hourly space velocity is ordinarily from about 0.5 to 5.0, with the amount of hydrogen consumed generally varying from about 50 to 1500 s.c.f./b.

Variations can of course be made without departing from the spirit of this invention.

Having thus described my invention, what I desire to secure and claim by Letters Patent is:

1. A hydrodenitrogenation catalyst comprising a composite made up of (1) a silica-zirconia gel containing from about 75 to 90 percent by weight silica and from about 10 to 25 percent by weight zirconia, intimately admixed with (2) from about 0.1 to 25 percent by weight of said gel of a hydrogenation component selected from the group consisting of metals, metal oxides, and metal sulfides wherein the metal is from Groups VI–B, VIII, or both of the Periodic Table, said composite having a sulfide content expressed as free sulfur, of from about 1 to 15 percent by weight and said composite containing from about 0.1 to 10 percent by weight of a metal fluoride wherein the metal is from Group III–A of the Periodic Table, bismuth, a rare earth metal, or mixtures thereof.

2. The catalyst of claim 1 wherein the metal fluoride is aluminum fluoride and the hydrogenation component is a combination of cobalt oxide and molybdenum oxide.

3. The catalyst of claim 1 wherein the metal fluoride is aluminum fluoride and the hydrogenation component is a combination of nickel oxide and tungsten oxide.

4. A process for hydrodenitrogenating a hydrocarbon charge containing organic nitrogen compounds comprising contacting the same in the presence of hydrogen with the catalyst of claim 1.

5. The process of claim 4 wherein the hydrocarbon charge is characterized by an initial boiling point of at least about 400° F., a 50 percent point of at least about 500° F., and an end point of at least about 600° F.

6. The process of claim 5 wherein the hydrodenitrogenation is carried out at a temperature of from 400 to 950° F. under a hydrogen pressure of from about 500 to 5000 p.s.i.g. with a liquid hourly space velocity of from about 0.1 to 10, the molar ratio of hydrogen to hydrocarbon charge being from about 2 to 80.

7. A process for hydrodenitrogenating a hydrocarbon charge containing organic nitrogen compounds comprising contacting the same in the presence of hydrogen with the catalyst of claim 2, said process being carried out under substantially anhydrous conditions.

References Cited

UNITED STATES PATENTS

| | | | |
|---|---|---|---|
| 3,067,127 | 12/1962 | Plank et al. | 252—458 |
| 3,055,823 | 9/1962 | Mason et al. | 208—254 |
| 3,105,813 | 10/1963 | Gutberlet. | |
| 3,223,652 | 12/1965 | Erickson et al. | |
| 3,239,455 | 3/1966 | Lickus et al. | |
| 3,248,318 | 4/1966 | White. | |
| 3,262,874 | 7/1966 | Gatsis. | |
| 3,291,724 | 12/1966 | Gleim. | |
| 3,340,183 | 9/1967 | Egan. | |

DELBERT E. GANTZ, *Primary Examiner.*

G. J. CRASANAKIS, *Assistant Examiner.*

U.S. Cl. X.R.

252—436, 439, 441, 454, 456, 459

/ O-1050
(5/69)

UNITED STATES PATENT OFFICE
CERTIFICATE OF CORRECTION

Patent No. 3,444,074        Dated May 13, 1969

Inventor(s) Tsoung Y. Yan

It is certified that error appears in the above-identified patent and that said Letters Patent are hereby corrected as shown below:

Column 4, line 45, "VII" should be --VIII--. Column 5, line 29, "-zircondia" should be -- -zirconia--. Column 8, line 14, "10" should be --100--; Column 8, line 30, "14" should be --194--.

SIGNED AND
SEALED

AUG 26 1969

(SEAL)
Attest:

Edward M. Fletcher, Jr.
Attesting Officer

WILLIAM E. SCHUYLER, JR.
Commissioner of Patents